(12) United States Patent
Light et al.

(10) Patent No.: US 7,963,380 B2
(45) Date of Patent: *Jun. 21, 2011

(54) OD WIPER

(75) Inventors: Gerard M. Light, Marshall, MI (US); Clinton J. Gautsche, Union City, MI (US); Grover C. DeHart, Marshall, NC (US)

(73) Assignee: BorgWarner Inc., Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 12/693,353

(22) Filed: Jan. 25, 2010

(65) Prior Publication Data

US 2010/0122885 A1 May 20, 2010

Related U.S. Application Data

(63) Continuation of application No. 11/278,563, filed on Apr. 4, 2006, now Pat. No. 7,650,974.

(60) Provisional application No. 60/676,858, filed on May 2, 2005, provisional application No. 60/676,711, filed on May 2, 2005.

(51) Int. Cl.
    *F16D 35/00* (2006.01)

(52) U.S. Cl. ............................ 192/58.7; 192/58.61

(58) Field of Classification Search ............ 192/58.7, 192/58.61
    See application file for complete search history.

(56) References Cited

U.S. PATENT DOCUMENTS

| 3,659,061 | A | * | 4/1972 | Andreaggi | 200/5 EA |
|---|---|---|---|---|---|
| 3,955,234 | A | * | 5/1976 | Roefaro | 15/236.06 |
| 4,383,597 | A | * | 5/1983 | Blair | 192/58.681 |
| 4,564,094 | A | * | 1/1986 | Storz | 192/58.7 |
| 4,924,985 | A | * | 5/1990 | Kennedy | 192/58.7 |
| 4,938,329 | A | * | 7/1990 | Kennedy | 192/58.7 |
| 4,977,990 | A | * | 12/1990 | Mader | 192/58.7 |
| 5,920,048 | A | * | 7/1999 | Crippen et al. | 200/61.89 |
| 7,650,974 | B2 | * | 1/2010 | Light et al. | 192/58.7 |

* cited by examiner

*Primary Examiner* — Rodney H Bonck

(57) ABSTRACT

A viscous fan drive having improved pumping efficiency from removing fluid from a fluid operating chamber to a fluid reservoir chamber is achieved by providing a wiper element that is located within the radial clearance between the clutch and the housing that effectively seals leakage paths leading (upstream) and trailing the wiper. The wiper element includes a radial tang that is positioned within a corresponding slot of the cover wall. The wiper element also has a pair of spaced apart arms extending from the radial tang portion each having a radial outer surface that has a similar radius as the cover wall and a radial inner surface has a similar radius as the clutch. The wiper element also preferably includes details designed to seal the radial inner surface to the outer periphery of the clutch during fan drive operation and a locating detail to aid in assembly.

12 Claims, 4 Drawing Sheets

OD WIPER

CROSS REFERENCE TO RELATED APPLICATION

The present invention is a continuation of U.S. application Ser. No. 11/278,563 filed Apr. 4, 2006 now U.S. Pat. No. 7,650,974, which claims priority from U.S. Provisional Application Ser. Nos. 60/676,858 and 60/676,711, both filed May 2, 2005, and is also related to U.S. Pat. No. 6,752,251, filed on Nov. 4, 2002, and entitled "Electronically Controlled Viscous Fan Drive", which is incorporated by reference herein.

TECHNICAL FIELD

The invention relates generally to fan drive systems and more specifically to a viscous fan drive having a modified and improved spool valve.

BACKGROUND ART

The present invention relates to fluid-coupling devices of the type including both fluid operating chamber and a fluid reservoir chamber, and specifically to the providing a more efficient pumping mechanism for removing fluid from the operating chamber.

Although the present invention may be used advantageously in fluid-coupling devices having various configurations and applications, it is especially advantageous in a coupling device of the type used to drive a radiator cooling fan of an internal combustion engine, and will be described in connection therewith.

Fluid-coupling devices ("fan drives") of the viscous shear type have been popular for many years for driving engine cooling fans, primarily because their use results in substantial saving of engine horsepower. The typical fluid-coupling device operates in the engaged, relatively higher speed condition only when cooling is needed, and operates in a disengaged, relatively lower speed condition when little or no cooling is required. These devices typically use integrally formed wipers to control the amount of viscous fluid exiting the working chamber to control the relative engagement of the fan drive at a given input speed. Electronically controlled fan drives achieve a very low disengaged fan speed by removing nearly all the viscous fluid from the fan drive labyrinth, or working chamber, during disengaged operations. This is desirable in that it minimizes parasitic power losses in the vehicle while improving fuel economy.

However, these systems are known to have less damping and are prone to troublesome vibration. Countermeasures used to combat this problem are to use a relatively loose fan drive bearing and to operate with higher than normal axial clearances between the clutch plate (rotor) and the housings (cover and body). This allows the clutch and housing to move relatively independently when the system is in resonance, reducing vibration amplitude. In most conventional fan drive systems, the wiper is located adjacent to an axial face of the clutch. However, locating the wiper here on the fan drive typically results in contact between the clutch and wiper during resonance that is unacceptable.

To combat this resonance problem, some fan drive systems have provided a wiper that is located within the radial clearance between the clutch and the housing. This wiper is thus generically known as an OD wiper, or outer diameter wiper. However, leakage paths near the wiper due to the large axial internal clearances between the cover, clutch and body are the primary culprit affecting robust performance of these types of fan drives.

SUMMARY OF THE INVENTION

The present invention addresses some of the issues described above by providing a wiper element that is located within the radial clearance between the clutch and the housing that effectively seals leakage paths leading (upstream) and trailing the wiper.

The wiper element of the present invention is a molded plastic part having a radial tang that is positioned within a corresponding slot of the cover wall. The wiper element also has a pair of spaced apart arms extending from the radial tang portion each having a radial outer surface that is coincident with the cover wall. The wiper height is the same, less sliding clearance, as the cover wall for good sealing at the top and bottom interfaces. Further, the clutch periphery is sized to give sliding clearance to the wiper. A locating detail may be added to the radial tang to loosely affix the wiper element within the slot for assembly efficiency.

In alternative embodiments, the wiper element is designed to push the radial arms away from the cover wall and towards the outer periphery of the clutch as the fluid-coupling device is operating to more effectively capture the viscous fluid and move it through the scavenge hole as it is flung outwardly from the fluid operating chamber to the cover wall. This increases fluid pressure near the scavenge hole to improve pump out efficiency at any given engine speed. To accomplish this, the wiper arms are preferably chamfered inward towards the space between the radial arms. In addition, the ends of the are beveled or otherwise slanted along a surface such that the extreme ends are located further away from the cover wall than a middle portion of the ends so that the arms are pushed towards the outer periphery of the clutch as viscous fluid is scraped as the fluid operating device is operating.

The wiper element of the present offers many advantages over prior art wiper systems. First, the presence of the long spaced apart arms provides sealing means upstream of the scavenge hole which can accommodate a fan drive that has a loose support bearing arrangement, effectively sealing leakage paths. In addition, the present wiper is formed of a polymer material that may be abraded during usage during high temperature operation without damaging the viscous fluid. This allows design clearances between the internal fan drive parts (clutch, body and cover) to avoid rub during resonance operations and further allows design clearances to be chosen which optimizes performance and reducing disengagement time variation.

Other features, benefits and advantages of the present invention will become apparent from the following description of the invention, when viewed in accordance with the attached drawings and appended claims.

BEST MODE(S) FOR CARRYING OUT THE INVENTION

Figure 1:
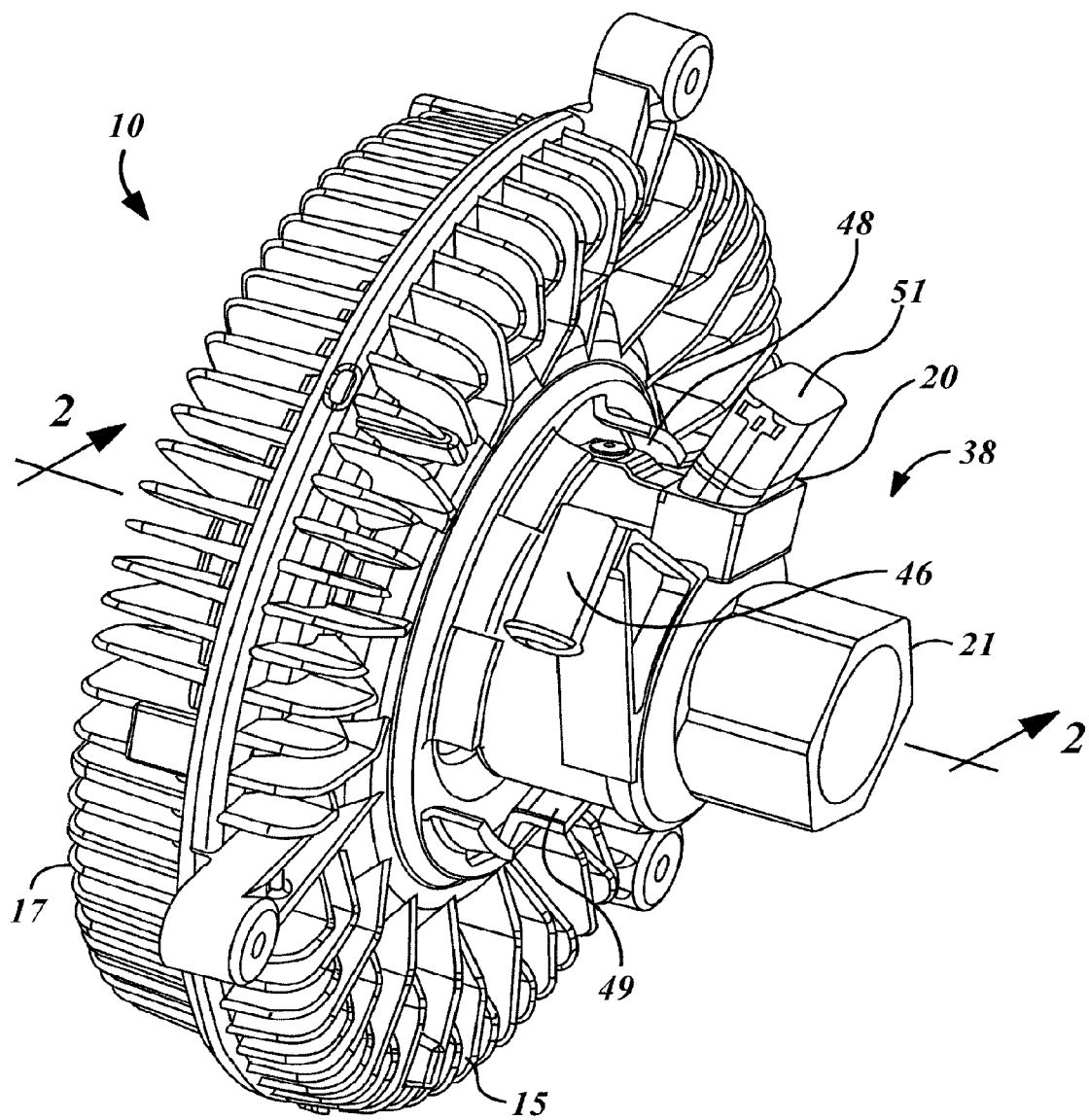
FIG. 1 is a perspective view of a fluid-coupling device according to one preferred embodiment of the present invention in the disengaged position.
Figure 2A:
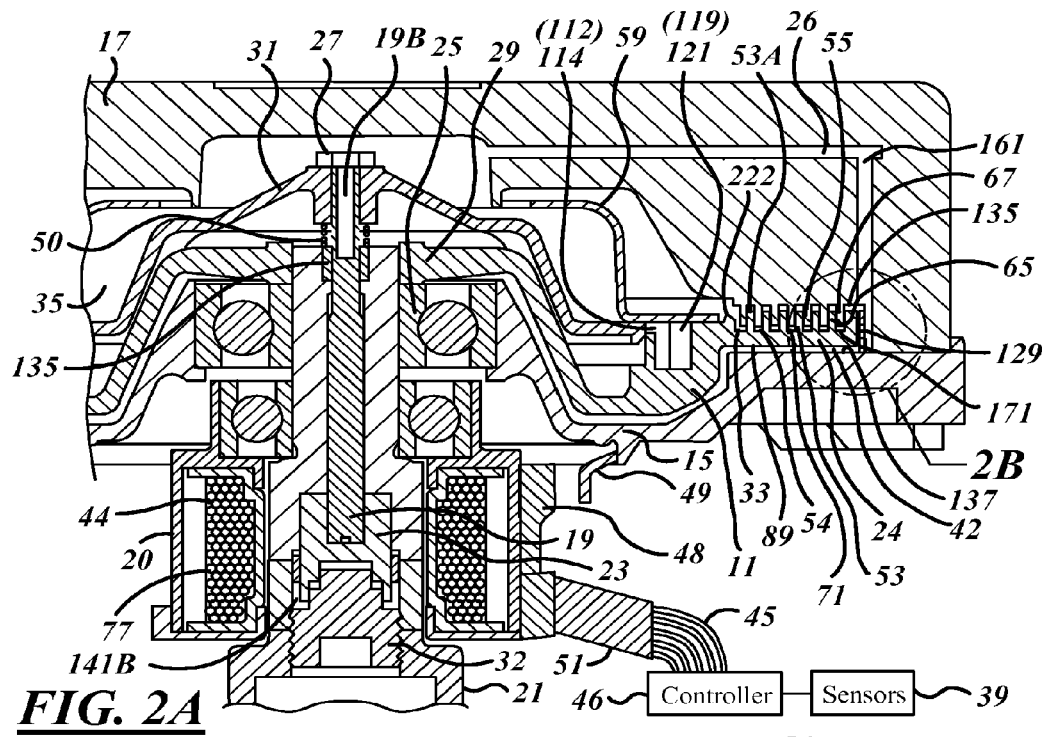
FIG. 2A is a section view of FIG. 1 taken along line 2-2 showing the fluid-coupling device in a disengaged position.
Figure 3:
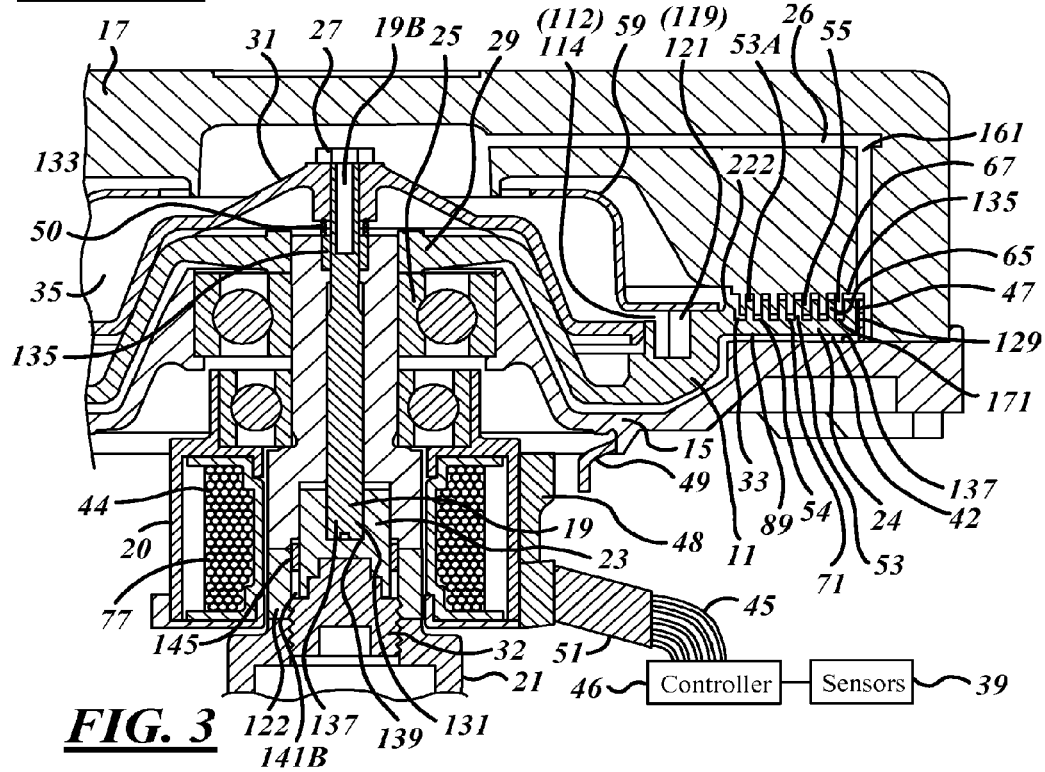
FIG. 3 is a section view of FIG. 1 taken along line 2-2 showing the fluid-coupling device in a fully engaged position.

Referring now to the drawings, which are not intended to limit the invention, FIGS. 1-3 illustrates one preferred form of a fluid-coupling device 10 ("viscous fan drive") of a type utilizing the present invention. The fluid-coupling device 10 includes an input-coupling member, or clutch, generally designated 11, and an output-coupling member, or assembly, generally designated 13. The assembly 13 includes a housing member (body) 15, and a cover member (enclosure) 17, the members 15 and 17 being secured together by a rollover of the outer periphery of the cover member 17, as is well known in the art.

The fluid-coupling device 10 is adapted to be driven by a liquid cooled engine, and in turn, drives a radiator-cooling fan, neither of which is shown herein. The fan may be attached to the housing member 15 by any suitable means, such as is generally well known in the art, and as is illustrated in the above-incorporated patents. It should be understood, however, that the use of the present invention is not limited to any particular configuration of fluid-coupling device, or fan mounting arrangement, or any particular application for the fan drive, except as is specifically noted hereinafter. For example, the present invention could be used with a fan drive of the type adapted to have the radiator-cooling fan attached to the cover member, rather than to the body member.

Figure 2B:
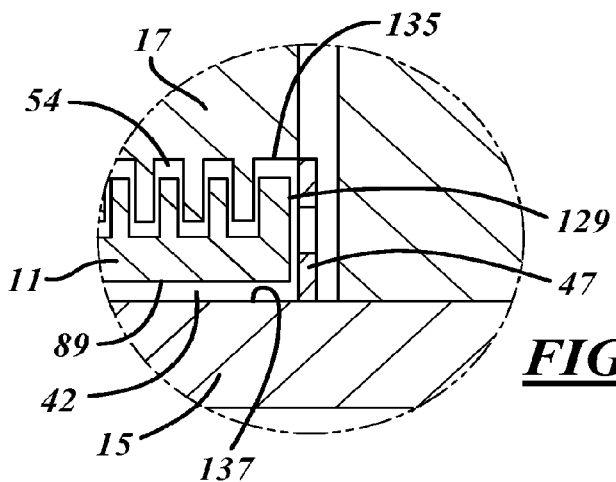
FIG. 2B is a close-up view of a portion of FIG. 2A.

As best shown in FIGS. 2A, 2B and 3, the coupling device 10 includes an input-coupling assembly 38 on which the input-coupling member 11, or clutch, is mounted. The input-coupling assembly 38 is rotatably driven, such as by means of an hexagonal, internally threaded portion 21, which would typically be threaded onto an externally threaded shaft extending from the engine water pump. The assembly 38 functions as a support for the inner race of a bearing set 25, which is seated on the inside diameter of the housing member 15. The input coupling assembly 38 is also coupled to and surrounds an actuator shaft 19. The forward end 19*b* of an actuator shaft 19 is slidingly engaged between the assembly 38 and an opening defined by a hub portion 29 of the input-coupling member 11. As a result, rotation of the assembly 38 causes rotation of the input-coupling member 11. An armature 23 is also coupled to a portion of the actuator shaft 19, which is kept in place within the assembly 38 by a plug 32. The armature 23 is guided within the assembly using a close fitting bushing 145.

The housing member 15 and the cover member 17 cooperate to define a fluid chamber, which is separated by means of a substantially circular valve disk 31 and reservoir cover 59, into a fluid operating chamber 33 and a fluid reservoir chamber 35. The valve disk 31 is operatively coupled with the forward end 19*b* of the actuator shaft 19 by screw 27 and is disposed within the reservoir cover 59 and the input-coupling member 11. The cover member 17 and the input-coupling member 11 define the fluid operating chamber 33, while the reservoir cover 59 and the input-coupling member 11 define the fluid reservoir 35.

Figure 4:
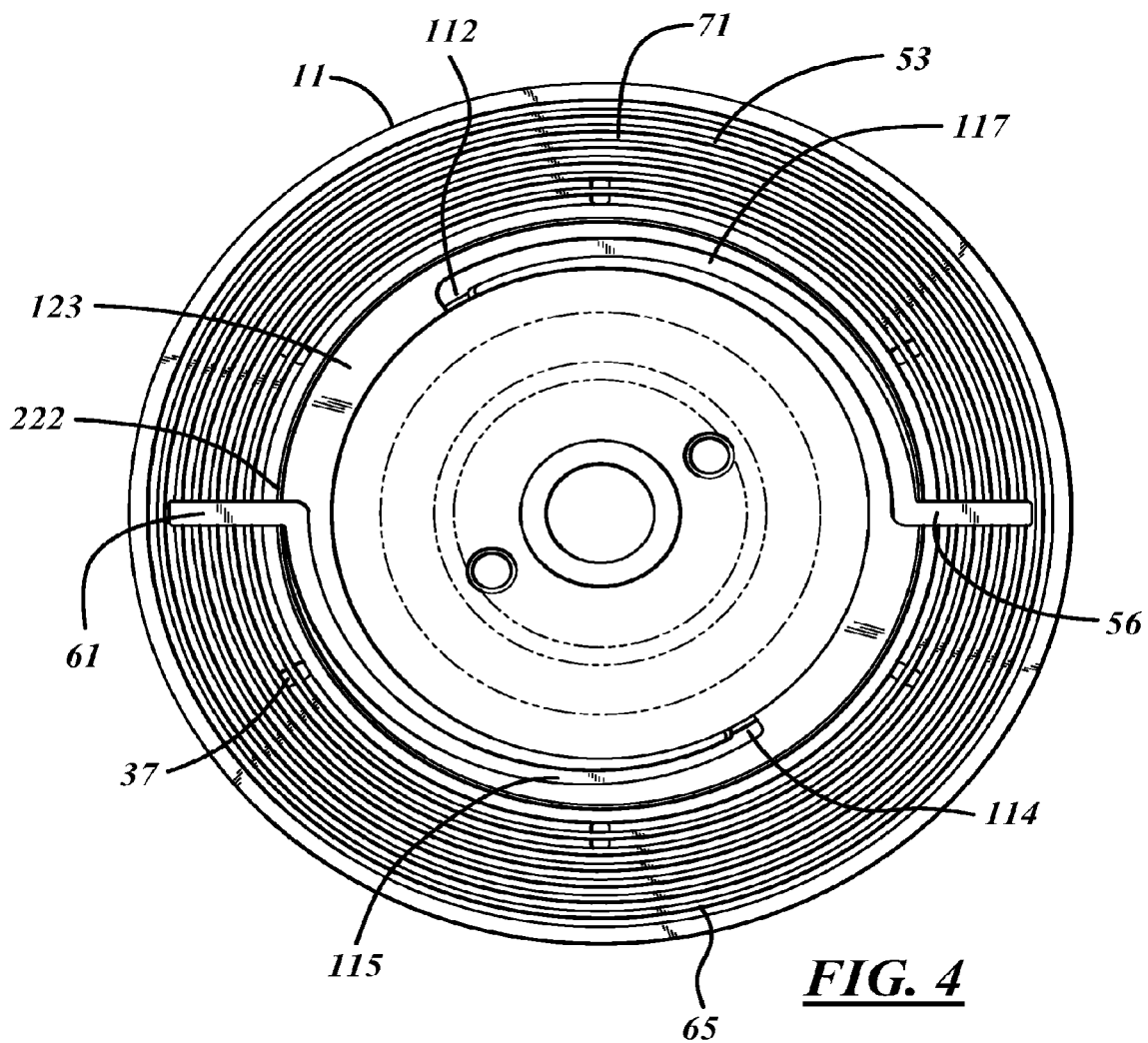
FIG. 4 is a perspective view of the one side of the clutch according to a preferred embodiment of the invention.
Figure 5:
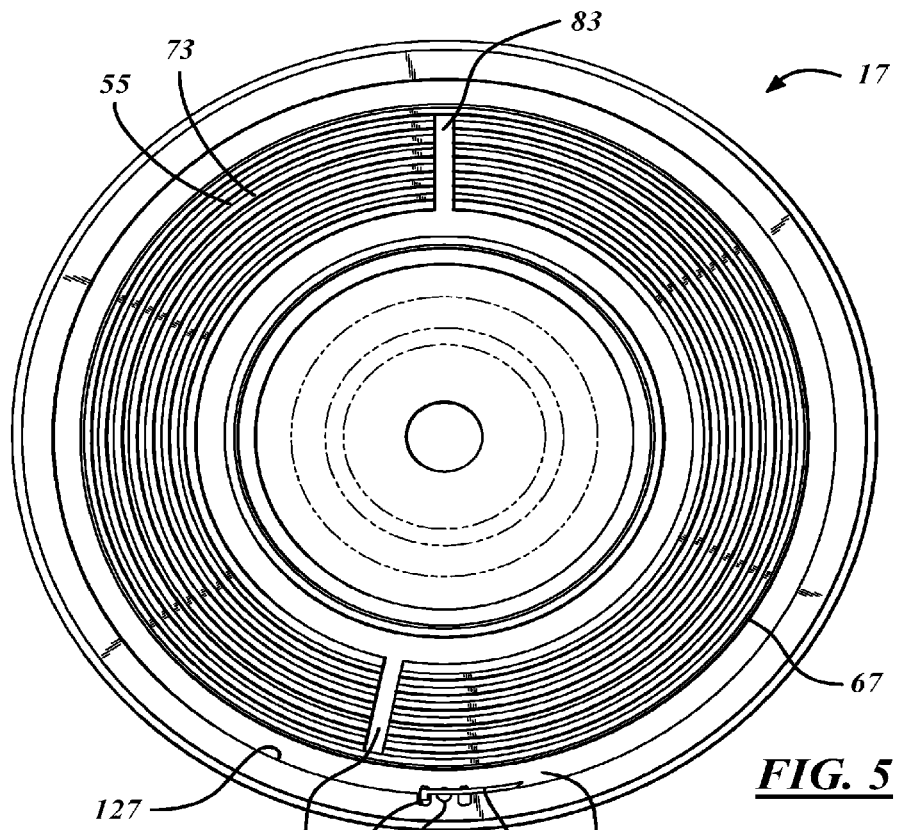
FIG. 5 is a perspective view of one side of the cover member and wiper according to a preferred embodiment of the present invention.

As best shown in FIGS. 4 and 5, the input-coupling member 11 includes a plurality of annular lands 53 that are located outwardly from the hub 29. A plurality of grooves 71 are contained between each respective pair of lands 53. The adjacent surface of the cover member 17 includes a plurality of corresponding annular lands 55 and associated grooves 73. The annular lands 53, 55 are interdigitated to define a serpentine-shaped viscous shear space 54 therebetween. The input coupling member 11 and cover member 17 also each include a pair of radial slots 56, 61 and 81, 83 that are used on the input-coupling member 11 and cover 17 to help get viscous fluid in and out of the viscous shear space 54 of the operating chamber 33. The input coupling member 11 optionally include one of more openings 37 located within the lands 53 and grooves 71 that extend through the member 11 to its rearward side 89. The rearward side 89 and housing member 15 therefore define a chamber 42.

The input-coupling member 11 also included a pair of cold pump out slots 117, 115 defined between the rollover 222, and a sealing surface 123. The reservoir cover 59 seals onto the top of the sealing surface 123 held in place by the rollover 222 (shown before the rollover operation). The slots 117 and 115 and reservoir cover 59 therefore define a passageways 119 and 121, respectively. The passageways 119, 121, being oriented 180 degrees opposite each other around the outer periphery of the cover 17 and clutch 11 act as an antidrainback chamber when the cover 17 is not rotating (i.e. when the fan drive is disengaged), therein minimizing morning sickness that typically occurs in viscous type clutch systems.

The cover 59 and input coupling member 11 also define a pair of fill holes 112, 114. The fill holes 112, 114 are preferably disposed 180 degrees opposite each other around the periphery of the cover 17 and input-coupling member 11 with respect to one another and are located at the junction between the reservoir chamber 35 and the respective passageways 119, 121. As will be described in further detail below, the fill holes 112, 114 may be opened or covered (i.e. closed), depending upon the relative positioning of the valve disk 31 relative to the fill holes 112, 114, to control the amount of viscous fluid entering the operating chamber 33 and shear space 54 through the passageways 119, 121. Varying the amount of viscous fluid within the shear space 54 varies the wetted area of the shear space 54 and thereby controls the amount of torque transferred from the input coupling member 11 to the cover member 17 at a given engine input speed.

The cover member 17 also includes a coupled pumping element 47, also referred to as a "wiper" element, operable to engage the relatively rotating fluid flung outward from the shear space 54 and chamber 42, and generate a localized region, or scavenge area 43 of relatively higher fluid pressure. As a result, the pumping element 47 continually pumps a small quantity of viscous fluid from the shear space 54 and chamber 42 back into the reservoir chamber 35 through a scavenge port 161 coupled to a radial passage 26 defined by the cover member 17 at a given engine input speed, in a manner well known in the art. The wiper element 47 is coupled within a notch 57 in the cover member 17 and is positioned between a cover wall portion 127 and the outer periphery 129 of the input-coupling member 11 is best shown and will be described further below in FIGS. 5-8.

Referring now to FIGS. 1-3, the actuator subassembly 20 includes a plurality of coils 77 contained within a bobbin 44. The coils 77 are electrically coupled to an external controller 46 through wires 45 contained within an electrical connector 51 coupled to the bobbin 44. The external controller 46 is also electrically coupled to a Hall effect sensor 48 through connector 51. The Hall effect sensor 48 senses the rotational speed of the housing member 15 via one or more pole pieces 49 coupled to the housing member 15 and sends an electrical impulse to the controller 46 as a function of the measured rotational speed. A plurality of other sensors 39, including, for example, an engine temperature sensor, are also electrically connected to the controller 46 and provide electrical signals regarding a particular engine operating parameter.

The controller 46 interprets the electrical signals from the Hall effect sensor 48 and other sensors 39 and sends an electrical signal to the coils 77 to control the relative positioning of the valve disk 31 to control the relative engagement or disengagement of the input-coupling device 11.

As may be best seen in FIG. 2, when the coupling device 11 is rotating and in the disengaged position, a spring 50 biases the valve disk 31 to cover the fill holes 112, 114, and hence substantially all of the viscous fluid in the device 10 is contained within the fluid reservoir chamber 35. The spring 50, as shown in FIGS. 2 and 3, is coupled along the outer periphery of the actuator shaft 19 and between the valve disk 31 and the end of the internally threaded portion 21. In the disengaged position, viscous fluid is prevented by the valve disk 31 from entering the operating chamber 33 and shear space 54 to drive cover member 17. In FIG. 3, when the coupling device 11 is rotating and in the fully engaged position, viscous fluid flows freely through the respective fill hole 112, 114 to the operating chamber 33 to drive the cover member 17 and coupled fan as a function of the given input speed and amount of viscous fluid contained in the shear space 54. Each is described in further detail below.

To engage the fan drive, as shown in FIG. 3, the external controller 46 sends an electrical signal through the actuator subassembly 20 to the electrical coil 77, therein creating a magnetic flux through the input-coupling assembly 38 within the viscous fan drive 10, including the armature shaft 19, armature 23 and plug 32, but not through a non-magnetic metal wafer portion 122 welded to a portion of the assembly 38. The armature 23, which is common steel, reacts in response to the magnetic flux to axial move in a direction away from the spring 50 (i.e. moving in a direction against the spring 50 (downward in FIG. 3)) within the assembly 38 and along the bushing 145. As the actuator shaft 19 and valve disk 31 are coupled to the armature 23, they are pulled downward as well, thereby causing valve disk 31 to unseal from the reservoir cover 59 and uncover the cast-in fill holes 112, 114, thereby allowing the movement of viscous fluid from the reservoir chamber 35 to the operating chamber 33 through the respective passageways 119, 121 and through a respective pair of slots 56, 81 or 61, 83. This viscous fluid then enters the shear space 54 between the set of respective lands 53, 55 and 65, 67. As the fluid fills the shear space 54 it transmits torque from the input coupling member 11 to the cover member as it is sheared, thereby driving the cover member 17 (and hence a fan remotely coupled to the cover member 17) as a function of the input speed to the input-coupling member 11 and as a function of the amount of viscous fluid contained in the shear space 54, as is understood by those of ordinary skill in the art. This is the so-called engaged position, as shown in FIG. 3.

By decreasing the amount of power to the actuator subassembly 20, and hence magnetic flux available to pull the armature 23 downward, the spring 50 biases back towards its natural position (back toward the position as shown in FIG. 3), thereby urging the valve disk 31 back towards the reservoir cover 59 to partially cover the fill hole 112, 114. This allows viscous fluid to enter the operating chamber 33 through the fill hole 112, 114, but at a rate less than the fully engaged position. This is the so-called mid-range or partially engaged position. In this position, the cover member 17 rotates at a rate slower than the fully engaged position as a function of the relatively lesser amount of viscous fluid entering the shear space 54.

In the absence of electrical actuation, as shown in FIG. 2, the spring 50 biases back to its natural position and therein urges the valve disk 31 upwardly to seal against the reservoir cover 59 and cover the fill hole 112, 114. This prevents viscous fluid from entering the operating chamber 54, and therein prevents the viscous engagement of the cover member 17 as a result.

The amount of electrical power supplied in terms of pulse width modulation from the external controller 46 and power source, and hence the external controller 46 determines the amount of magnetic flux created to drive the armature 23 in response. The controller receives a set of electrical inputs from various engine sensors 38, and Hall effect sensor 48. When the controller 46 determines that one or more of these sensors is sensing an engine operating conditions outside the desired range, the external controller 46 and power source will send electrical signal to the coil 77. Thus, for example, if the external controller 46 determines that the engine coolant temperature is too high as measured by sensor 39, a signal may be sent from the controller 46 to the actuator subassembly 20 to activate the coil 77 to a desired pulse width, therein pulling the armature 23 to partially or fully uncover the valve disk 31 from fill holes 112, 114.

Of course, as one of skill in the art appreciates, the actual amount of pulse width modulation necessary to move the valve 31 between a fully engaged and disengaged position is dependent upon many factors. For example, the size and shape of the spring 50 itself is a major factor is the amount of pulse width modulation necessary to move the armature 23. A stiffer or larger spring 50 may require a larger pulse width to achieve a similar biasing of the spring 50 as compared with a more flexible or smaller spring.

Further, the size of the fill holes 112, 114 may affect the amount of biasing necessary. For example, clutch 11 with larger fill holes 112, 114 may only require the valve disk 31 to slightly uncover one or both of the fill holes 112, 114 in order to provide adequate viscous fluid flow to the operating chamber 33 and shear space 54.

Figure 6:
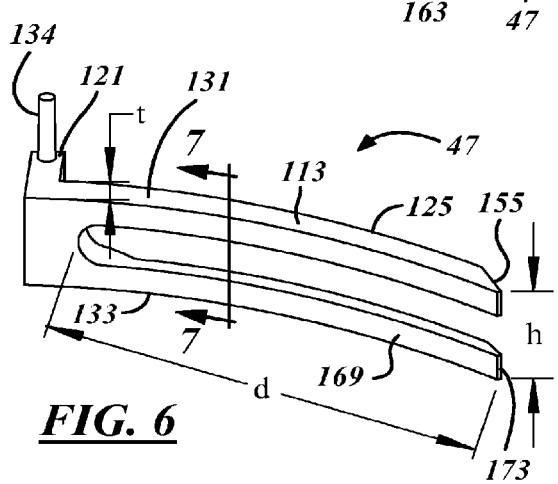
FIG. 6 is a perspective view of the wiper element according to a preferred embodiment of the present invention.
Figure 7:
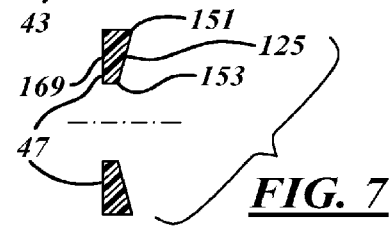
FIG. 7 is a section view of FIG. 6 taken along line 7-7.

Referring now to FIG. 6-7, a perspective view of the wiper element 47 in accordance with a preferred embodiment of the present invention is depicted. The wiper element 47 is preferably formed in a conventional molding, stamping or extrusion process or other similar manufacturing process from a durable, high temperature and chemically resistant hard plastic material such as polyetherimide. The wiper element 47 has a pair of spaced apart arms 113 extending from the radial tang portion 121 each having a radial outer surface 125 that has a similar radius as the cover wall portion 127 and a radial inner surface 169 that has a similar radius as the outer periphery 129 of the input coupling assembly 11. The wiper element 47 has a first and second axial surface 131, 133. The distance between the first and second axial surface 131, 133, or height h, is preferably the same as the height of the cover wall portion 127, less sliding clearance.

As best shown in FIG. 5, the radial tang 121 of the wiper element 47 of FIGS. 6 and 7 is positioned within a corresponding slot or notch 57 of a cover wall portion 127 of the cover 17. The radial tang 121 may include a locating detail 134 that fits within a corresponding hole 136 in the cover 17 and loosely fixes and locates the wiper element 47 within the notch 57 during assembly to aid in assembly efficiency. The arms 113 are positioned between the cover wall portion 127 of the cover 17 and the outer periphery 129 of the input-coupling device 11. The thickness t of the wiper element 47 is matches the radial clearance between the cover wall portion 127 and the outer periphery 129, less manufacturing tolerance and assembly variation, to ensure that there is not an interference fit between the wiper element 47, the input-coupling device 11, and the cover 17 *y*. When assembled the first axial surface 131 is coincident with the inner surface 135 of the cover 17, while the second axial surface 133 is coincident with inner surface 137 of the housing member 15 at the top of chamber 42. The scavenge port 161 is exposed within the opening 163 created between the spaced apart arms 113.

The arms 113 extend a distance d forward from the opening 163 of the scavenge port 161 so as to create a high pressure area 43 that helps to pump viscous fluid away from the shear space 54 and chamber 42 and through the opening 163 of the scavenge port 161.

As the input coupling assembly 11 rotates at a given engine speed, the arms 113 of "scrape" the viscous fluid that has been propelled radially outwardly towards the cover wall portion 127 from the shear space 54 and from the chamber 42 and moves it within the opening 163 to the scavenge port 161. The pressure of the viscous fluid being propelled radially outwardly also seals the radial inner surface 169 of the arms 113 of the wiper element 47 against the outer periphery 129 of the input coupling assembly 11, and therefore prevents leakage path for the fluid between the radial inner surface 169 and outer periphery 129.

As best shown in FIGS. 6 and 7, the arms 113 preferably include one or more design features that function to aid in pushing the radial inner surface 169 of the arms 113 against the outer periphery 129 of the input coupling assembly 11 and away from the cover wall portion 17 as the input coupling assembly rotates.

As best seen in FIG. 7, the arms 113 are chamfered downward away from the cover wall portion 127 along the radial outer surface 125 from its outer edge 151 to its inner edge 153. Thus, fluid "scraped" by the wiper element is directed between the arms 113 and pushes the wiper element 47 in a direction towards the outer periphery 129 and away from the cover wall portion 127 as the input coupling assembly 11 rotates, therein eliminating clearance between the radial inner surface 169 and the outer periphery 129. Further, in this condition, the wiper element 47 rides on a thin film of the viscous fluid contained between the cover wall portion 127 and the outer periphery 129.

In conjunction with the chamfering in FIG. 7, as best shown in FIG. 6, an outer tip portion 155 of the radial outer surface 125 of each of the arms 113 may also be beveled in a direction towards said radial inner surface 169. Thus, as viscous fluid "scraped" by the arms 113 over the beveled tip portion 155 and radial outer surface 125, the fluid pressure on the radial outer surface 125 pushes the wiper element 47 towards the outer periphery 129 and away from the cover wall portion 127 as the input coupling assembly 11 rotates, therein substantially sealing the radial inner surface 169 against the outer periphery 129.

In an alternative arrangement (not shown), the wiper element 47 may be formed without the chamfering shown in FIG. 7, but with the beveled outer tip portion 155 as shown in FIG. 6, and still fall within the spirit of the present invention.

Figure 8:
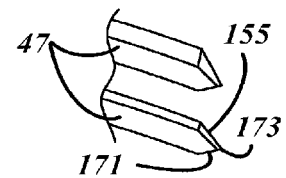
FIG. 8 is a perspective view of the wiper element according to another preferred embodiment of the present invention.

In another alternative arrangement, as shown in FIG. 8, the radial inner surface 169 may also include an inner tip portion 171 that is beveled towards said radial outer surface 125. The outer tip portion 155 and inner tip portion 169 terminate into one another at an outermost point 173 of the arm 113 located furthest from the radial tang 121. While not shown, the alternative embodiment of FIG. 8 may also include the chamfering described above in FIG. 7 and/or the locating detail 134 and still fall within the spirit of the present invention.

In addition, while the preferred embodiment of the wiper element 47 is described herein for use on an electronically controlled viscous fan drive in FIGS. 1-7 above, the invention is not limited to these devices. It is contemplated that the wiper element 47 may be used on any type of viscous fan drive wherein it is desirous to create a high pressure area corresponding to an opening designed to remove viscous fluid from a clutch shearing zone. Thus, the wiper element 47 may be used on mechanically controlled viscous fan drives in which fluid flow into the operating chamber is controlled by some non-electronic means such as a bimetallic valve. The wiper element may also be used on viscous fan drives in which fluid flow from the reservoir chamber to the operating chamber is not controlled.

The wiper element of the present offers many advantages over prior art wiper systems. First, the presence of the long spaced apart arms provides sealing means upstream of the scavenge hole which can accommodate a fan drive has a loose support bearing arrangement without creating leakage paths. In addition, the present wiper is formed of a durable chemically resistant polymer material such as polyetherimide that may be abraded during usage during high temperature operation without damaging the viscous fluid. This allows large design clearances between the internal fan drive parts (clutch, body and cover) to avoid rub during resonance operations and further allows design clearances to be chosen which optimizes performance and reducing disengagement time variation.

While the invention has been described in connection with one embodiment, it will be understood that the invention is not limited to that embodiment. On the contrary, the invention covers all alternatives, modifications, and equivalents as may be included within the spirit and scope of the appended claims.

What is claimed is:

1. A method for improving pumping efficiency in a viscous fan drive during operation, the viscous fan drive including an output-coupling member including a housing member coupled to a cover member, an actuator shaft partially disposed within said output-coupling member, an input-coupling assembly coupled to said actuator shaft and including an input-coupling member, said input-coupling-assembly and said actuator shaft capable of rotating at a given input speed, a fluid operating chamber including a shear space defined by said input-coupling member and said cover member, at least one fill hole contained in said input coupling member fluidically coupling said fluid reservoir chamber to said fluid operating chamber; and a scavenge hole including an opening contained in said cover member fluidically coupling said fluid operating chamber to said fluid reservoir chamber, the method comprising:

forming a wiper element of a molded plastic material comprising a pair of spaced apart arms coupled to and extending from a radial tang member, said arm members both extending in the same direction and positioned substantially perpendicular to said tang member and the longitudinal length of said arm members being substantially the same and the longitudinal length being substantially greater than the longitudinal length of said tang member;

introducing a notch to a cover wall portion of a cover member; and introducing said wiper element between said cover wall portion and an outer periphery of an input coupling member such that said radial tang member is contained within said notch and such that the radial outer surface of said pair of spaced apart arm members have a similar radius as said cover wall portion and such that the radial inner surfaces have a similar radius as an outer periphery portion of said input coupling-member along said length and such that said opening of said scavenge port is contained between said pair of spaced apart arm members;

wherein dynamic fluid sealing and pumping efficiency are improved.

2. The method of claim 1, wherein forming a wiper element and introducing said wiper element comprises:

forming a locating detail on said radial tang member, said locating detail extending in a direction perpendicular to both said tang member and said pair of spaced apart arm members;

introducing said locating detail within a corresponding hole in said cover member while said radial tang member is introduced within a notch of said cover wall, said wiper element positioned such that a radial outer surfaces of said pair of spaced apart arms have a similar radius as said cover wall portion and the radial inner surfaces have a similar radius as an outer periphery portion of said input coupling-member along said length and such that said opening of said scavenge port is contained between said pair of spaced apart arm members.

3. The method of claim 1 wherein said forming of said wiper element further comprises:

forming chamfers on the outer surfaces of each of said spaced apart arm members substantially along the length of each arm member;

wherein fluid scraped by the wiper element is directed between said pair of spaced apart arm members.

4. The method of claim 1 wherein said forming of said wiper element further comprises:

forming bevels on the distal ends of each of said arm members.

5. A wiper element for use in a viscous fan drive, the wiper element comprising:

a body member;

a tang member; and a pair of spaced apart arm members;

said pair of arm members both extending in the same direction and connected to said body member, the longitudinal length of said arm members being substantially the same and said longitudinal length being substantially greater than the longitudinal length of said body member;

said tang member being connected to said body member and extending in a direction substantially perpendicular to said pair of spaced apart arm members;

said tang member including a projecting locating member which extends in a direction substantially perpendicular to both said tang member and said pair of spaced apart arm members.

6. The wiper element of claim 5 wherein each of said arm members are curved in the same amount.

7. The wiper element of claim 5 wherein each of said arm members has an upper surface and a lower surface, and wherein each of said upper and lower surfaces are curved in the same direction and the same amount.

8. The wiper element of claim 5 wherein each of said arm members has an upper surface, and wherein each of said upper surfaces is chamfered, wherein fluid scraped by the wiper element is directed between said pair of spaced apart arm members.

9. The wiper element of claim 5 wherein each of said arm members has an outer surface and a distal tip portion, and each distal tip portion is beveled relative to the outer surface of each of said arm members.

10. A wiper element for use in a viscous fan drive, the wiper element comprising:

a body member;

a tang member; and a pair of spaced apart arm members;

said pair of arm members both extending in the same direction and connected to said body member, the longitudinal length of said arm members being substantially the same and the longitudinal length being substantially greater than the longitudinal length of said body member;

said tang member being connected to said body member and extending in a direction substantially perpendicular to said pair of spaced apart arm members;

each of said pair of arm members having an outer surface and being curved in the same direction and the same amount;

each of said outer surfaces being chamfered along its length;

wherein fluid scraped by the wiper element is directed between said pair of spaced apart arm members.

11. The wiper element of claim 10 wherein each of said arm members has a distal tip portion, and each distal tip portion is beveled relative to said outer surface of each of said arm members.

12. The wiper element of claim 10 further comprising a locating member connected to said tang member, said locating member extending in a direction perpendicular to both said tang member and said pair of spaced apart arm members.

* * * * *